April 28, 1964 R. L. KOCH 3,130,781
RECOVERY OF HYDROCARBON MATERIAL BY IN-SITU COMBUSTION
Filed June 10, 1959 5 Sheets-Sheet 1

April 28, 1964   R. L. KOCH   3,130,781
RECOVERY OF HYDROCARBON MATERIAL BY IN-SITU COMBUSTION
Filed June 10, 1959   5 Sheets-Sheet 3

April 28, 1964  R. L. KOCH  3,130,781
RECOVERY OF HYDROCARBON MATERIAL BY IN-SITU COMBUSTION
Filed June 10, 1959  5 Sheets-Sheet 5

United States Patent Office 3,130,781
Patented Apr. 28, 1964

3,130,781
RECOVERY OF HYDROCARBON MATERIAL BY IN-SITU COMBUSTION
Robert L. Koch, Dallas, Tex., assignor, by mesne assignments, to Socony Mobil Oil Company, Inc., New York, N.Y., a corporation of New York
Filed June 10, 1959, Ser. No. 819,357
4 Claims. (Cl. 166—11)

This invention relates to the recovery of hydrocarbon material from a subterranean formation and relates more particularly to the recovery of such material by the method involving in place combustion of a portion of the hydrocarbon material in the subterranean formation.

It has been proposed to recover hydrocarbon material from a hydrocarbon-containing subterranean formation by a method which involves combustion of a portion of the hydrocarbon material within the formation. In this method, termed the in-situ combustion process, oxidizing gas is injected into the formation through an input well or wells and combustion of hydrocarbon material within the formation is initiated by suitable means. The formation is provided with an output well or is provided with a plurality of output wells. As the flow of oxidizing gas to the formation is continued, a combustion front migrates from the input well in the direction of the output well or wells. Hydrocarbon material and distillation and viscosity breaking products of the hydrocarbon material, as well as combustion gases, migrate in advance of the combustion front as it progresses in the direction of the output well or wells. The hydrocarbon and other materials flow into the output well or wells and they are removed therefrom for recovery of the desired hydrocarbons or other constituents. The heat of the fluids migrating in advance of the combustion front strips the hydrocarbon-containing formation of its water and of the greater portion of the hydrocarbon material and leaves behind a carbonaceous deposit. This carbonaceous deposit is essentially the fuel consumed in the process and the combustion front migrating from the input well to the output well or wells is the zone of combustion progressively moving through the carbonaceous deposit.

The in-situ combustion process for the recovery of hydrocarbon material is unusual among combustion processes. In the usual combustion process, the factor which determines economic practicality is the cost of the fuel, the oxidizing gas being relatively inexpensive. On the other hand, in the in-situ combustion process, the factor which determines economic practicality is the cost of providing the air or other oxidizing gas, the fuel being present in the subterranean formation and not involving a direct operating cost. Thus, in the in-situ combinstion process, in order to attain a minimum cost of operation it is essential to recover a maximum amount of hydrocarbon material for the amount of air or other oxidizing gas employed.

It is an object of this invention to increase the amount of hydrocarbon material recovered by in-situ combustion in relation to the amount of air or other oxidizing gas employed. It is another object of this invention to reduce the capacity of equipment required to supply compressed air or other oxidizing gas in carrying out in-situ combustion. If is another object of this invention to increase the proportion of hydrocarbon material which is recovered from a formation by an in-situ combustion process. These and other objects of this invention will become apparent from the following detailed description.

In accordance with the invention, following initiation of combustion, oxidizing gas is injected into the formation under such conditions of differential of pressure between the input well and an output well that migration of the combustion front occurs at a rate that is sufficiently high to sustain combustion within the formation but insufficiently high to displace hydrocarbon material from the formation at a rate greater than it can be produced from the output well.

In any combustion operation, combustion will be sustained only when conditions are such as to effect at least a minimum rate of combustion. In carrying out the in-situ combustion operation, the heat produced by combustion raises the temperature of the formation at the point of combination. However, a substantial portion of this heat is simultaneously carried away from the point of combustion by conduction through the formation or by transfer to the products of combustion and to any excess oxidizing medium. Where the rate at which heat is carried away is sufficiently great, compared with the rate at which heat is produced by combustion, to cause the formation temperature to be reduced below the ignition temperature of the fuel, combustion will cease. Accordingly, the oxidizing gas must be supplied to the formation at a rate sufficiently high that heat is produced at least as rapidly as it can be carried away. Combustion will be sustained within the formation when the oxidizing gas is supplied at a rate such that at least a minimum rate of migration of the combustion front is obtained.

I have discovered that, in carrying out an in-situ combustion operation, where the rate of migration of the combustion front is such that hydrocarbon material is displaced from the formation at a rate which is greater than the rate at which it can be produced from the output well or wells toward which the combustion front is migrating, one or both of two results can occur. For a given pressure gradient between the input well and the output well, and depending upon the pressure elsewhere within the subterranean formation, a portion of the displaced hydrocarbon material may become unrecoverable. Additionally, under given conditions of pressure gradient between the input well and the output well or wells, and pressure elsewhere within the formation, flow of oxidizing gas can become so restricted as to result in extinguishment of combustion either partially or completely.

The air, or other oxidizing gas, injected into the formation through an input well during the combustion operation will flow through the formation from the input well in the direction of decreasing pressure. The lowest pressures in the formation will be in the direction of the output well or wells. Thus, the oxidizing gas will flow in the direction of an output well or wells. Further, other things being equal, the rate at which the oxidizing gas will flow through the formation from an input well to any output well will depend upon the pressure gradient between the input and output wells.

The amount of carbonaceous deposit, or fuel, produced per unit volume of formation by the heat of the fluid migrating in advance of the combustion front will depend primarily upon the character of the hydrocarbon material originally in the formation. Thus, when the combustion front arrives at any portion of the formation, the amount of carbonaceous deposit per unit volume of formation will have become fixed. The rate of combustion of the carbonaceous deposit in any unit volume of the formation, other things being equal, will depend upon the rate at which the oxidizing gas is supplied to this unit volume of the formation. Accordingly, the rate of combustion front advance is a function of the pressure gradient between the input well and the output well.

The minimum rate of migration of the combustion front is a function of the bulk density of the dry material of the formation, the specific gravity and viscosity of the hydrocarbon material originally in the formation, and the thickness of the formation. Apparently, the bulk density of the dry material of the formation and the thickness of the formation govern the temperature which is attained in the combustion region for a given rate of supply of oxidizing gas. Further, the specific gravity and viscosity of the hydrocarbon material originally in the formation govern the amount of the carbonaceous fuel produced per unit volume of formation. While the viscosity of the hydrocarbon material has an effect on the amount of carbonaceous fuel, the amount of carbonaceous fuel, from a practical standpoint, is in almost direct relation to the specific gravity of the hydrocarbon material. The minimum rate of migration of the combustion front, as found by me is expressed by the equation:

$$V = \frac{0.0235\rho}{hg} \qquad (1)$$

In this equation:

$V$=minimum rate of migration of the combustion front in feet per 24-hour day,
$\rho$=bulk density of the dry formation in pounds per cubic foot,
$g$=the specific gravity of the hydrocarbon material originally in the formation, and
$h$=the thickness of the formation in feet.

In the practice of the invention, a pressure differential is maintained between the input and output wells to effect a rate of flow of oxidizing gas through the formation between the input and output wells to obtain a rate of migration of the flame front at least as great as that given by Equation 1.

In in-situ combustion operations, with migration of the combustion front through the formation, hydrocarbon material is displaced from the formation, and this hydrocarbon material advances, as a result of the pressure gradient, in the direction of an output well. Hereinafter, for purposes of simplification of description, the term "oil" will be employed as a substitute for the term "hydrocarbon material." The rate at which the oil is displaced from the formation will depend upon the rate at which the combustion front is migrating through the formation. Thus, the rate at which oil is displaced from the formation, other things again being equal, is a function of the pressure gradient between the input and output wells. The rate at which oil can be advanced through the formation in the direction of and produced from the output well or wells is, as I have also found, a function of the pressure gradient between the input and output wells. On the other hand, as I have further found, the rate at which oil can be advanced through the formation and produced from the output well or wells is additionally a function of factors related to the formation and the oil. Thus, the rate at which the oil can be advanced through the formation and produced from the output well or wells is limited and this rate can be less than the rate at which oil is displaced from the formation by migration of the combustion front.

In carrying out in-situ combustion where the pressure differential between the input and output wells is such that the combustion front displaces oil from the formation at a rate which is greater than that which the oil can be advanced through the formation and produced from the output well or wells, the pressure in the formation about the output well or wells tends to rise. Upon a rise in the pressure about the output well or wells, the direction of a given pressure gradient within the formation can change. The direction of this given pressure gradient will not now necessarily be toward the output well or wells but will be toward any point in the formation where the lowest pressure exists. The oil displaced from the formation by the migrating combustion front in excess of that which can be produced from the output well or wells will flow in this new direction of the given pressure gradient. Thus, the oil displaced by the combustion front in excess of the amount that can be produced by the output well or wells will flow into the formation in a direction not necessarily toward the output well or wells. The portion of this oil which has moved into those portions of the formation not included within the path of flow of oil established by the initial pressure gradient between the input and output wells, accordingly, becomes unrecoverable by that particular in-situ combustion operation.

A rise in the pressure about the output well or wells may not cause flow of all the excess oil into those portions of the formation not included within the path of flow of oil established by the initial pressure gradient between the input and output wells. The pressures in the formation, or conditions otherwise, may be such that there will be no change in the direction of a given pressure gradient. In this case, the excess oil, being unable to flow elsewhere, will flood the formation in the direction of flow toward the output well or wells. This results in a continued rise in the pressure within the formation and the pressure gradient between the input and output wells will accordingly begin to decrease. As a consequence of the decrease in the pressure gradient, the rate at which the oxidizing gas flows through the formation will decrease. As a result of the decrease in the rate of supply of oxidizing medium, those portions of the formation previously receiving a minimum supply of oxidizing gas to maintain combustion will receive less than this minimum supply. Thus, extinguishment of combustion will occur. As the rate of supply of oxidizing gas further decreases with decrease in pressure gradient, the effect will become greater and more and more of the combustion front will be extinguished. Thus, depending upon the extent of the decrease in the pressure gradient, a part or all of the combustion front will become extinguished.

The rise in the pressure about the output well or wells may cause a combination of movement of excess oil into the formation where it will become unrecoverable and partial or complete extinguishment of the combustion front. A change in the direction of a given pressure gradient may occur with flow of oil into the formation out of the path of flow to the output well or wells. However, the extent to which this oil can thus flow out of the original path of flow to the output well may be restricted and flooding can result. An increase in the pressure about the output well or wells may then occur and the combustion front may become partially or completely extinguished.

Flooding of the formation as a result of a rise in pressure involves, among other things, an economic loss from the standpoint of the cost of supplying oxidizing gas. While the pressure gradient may decrease with consequent decrease in the rate of flow of oxidizing medium, the pressure at the input well will not decrease appreciably. The cost of maintaining the pressure with respect to the investment in compressor capacity as well as certain direct operating expense will remain the same regardless of the rate of flow of oxidizing medium. Therefore, even though there is a loss of benefit represented by the flooding of the formation there is not a corresponding decrease in costs.

The maximum rate at which oil can be advanced through the formation and produced from an output well or wells for any well pattern has been determined by me to be directly proportional to the pressure differential between the input and output wells, the effective permeability of the formation to the oil, and the thickness of the formation and to be inversely proportional to the viscosity of the oil at formation conditions. This rate is mathematically expressed by the following equation:

$$q_0 = \frac{1.007 \times 10^{-3} k_0 h (p_{iw} - p_{ow}) f}{u_0} \qquad (2)$$

where:

$q_0$=maximum rate at which oil can be produced in barrels per day, $k_o$=effective permeability of the formation to oil in millidarcies,
$h$=thickness of the formation in feet,
$p_{iw}$=pressure at the input well in pounds per square inch absolute,
$p_{ow}$=pressure at the output well in pounds per square inch absolute,
$f$=friction factor, and
$u_o$=viscosity of the oil in centipoises.

In the practice of the invention, a pressure differential is maintained between the input and output wells to effect a rate of flow of oxidizing gas such that the rate of migration of the combustion front is at least as great as that given by Equation 1 and the rate at which oil is displaced by the migration of the combustion front is not in excess of that given by Equation 2. By the procedure of the invention, combustion is maintained, unnecessary loss of oil is avoided, and costs are minimized. Oxidizing gas passes through the formation to the output well at a rate sufficiently high to effect migration of the combustion front. Thus, injection of oxidizing gas into the input well or wells without corresponding benefit of displacement of oil from the formation does not occur. The rate at which oil is displaced within the formation by the movement of the combustion front is not in excess of the rate at which the oil can be produced from the output well or wells. Thus, oil is not forced into the formation where it will be unrecoverable for a particular combustion operation. The combustion front is not extinguished by reason of a decrease in the pressure differential caused by flooding of the formation, a minimum amount of oxidizing gas is employed, and the equipment required to maintain pressures at an input well can be of minimum capacity.

In determining the minimum rate of migration of the combustion front to sustain combustion, the values for the bulk density of the formation, the specific gravity of the hydrocarbon material, and the thickness of the formation are substituted in Equation 1 and the equation is solved for the value of V. The values for the bulk density of the formation, the specific gravity of the hydrocarbon material, and the thickness of the formation may be obtained by standard procedures. These procedures are not part of the invention. However, a brief description of various of such procedures for determining the values of the factors in the equation will be given.

The value for the bulk density of the dry formation can be determined from a core sample taken from the formation. The core sample is cleaned of formation fluids and is dried. Cleaning may be effected by extracting the core sample with acetone or other equally effective solvent for the hydrocarbon material. Drying may be effected at atmospheric or elevated temperatures. Cleaning and drying can be carried out by heating at an elevated temperature, and in oxidizing atmosphere, if necessary. In any heating procedure, temperatures should be employed that will not cause any change in the bulk density of the material of the core sample. Following cleaning and drying, the weight and volume of the core sample are determined. The bulk density of the dry formation will be the weight per unit volume of the dry core sample.

The specific gravity of the hydrocarbon material can be determined from a sample of the material taken from the formation. Where the formation is capable of producing the hydrocarbon material by pumping or otherwise, the sample can be taken from a well penetrating the formation. If the hydrocarbon material cannot be produced from the formation to a well, a sample of the hydrocarbon material may be obtained from a core sample taken from the formation. The hydrocarbon material may be removed from the core sample by any suitable procedure. Procedures which may be employed include heating, flooding with water, and solvent extraction. With any procedure, care must be taken, of course, to insure that irreversible change in the specific gravity of the hydrocarbon material is not effected. Thus, care must be taken that any heating procedure will not be carried out at such a temperature that the specific gravity of the oil will be permanently changed. Similarly, any solvent extraction procedure should be such that the hydrocarbon material is removed from the core sample and the material is freed of solvent without permanent effect on the specific gravity of the hydrocarbon material. The specific gravity of the hydrocarbon material is measured by any standard technique such as by weighing a known volume of the material. For purposes of Equation 1, the specific gravity of the hydrocarbon material is its weight per unit volume compared to the weight of the same volume of water at the same temperature.

The thickness of the formation can be determined by various procedures. For example, the thickness of the formation can be determined by test drilling or by geophysical surveying. Test drilling can be effected simultaneously with drilling of the input or output wells or by coring tests carried out subsequently to the drilling of the wells. Any type of geophysical survey, such as a seismic or electrical resistivity survey, that will indicate thickness of formation may be employed. Where the formation has been penetrated by a well and the well is uncased, the thickness of the formation can also be determined by imposing a fluid pressure within the well against the formation and measuring with an influx meter or other suitable flow measuring device the length of the formation into which fluid is flowing.

Knowing the minimum rate of migration of the combustion front to sustain combustion, oxidizing gas is injected into the input well or wells at a rate which will effect at least this rate of migration. The rate of flow of oxidizing gas to effect any given rate of migration can be readily determined. The product of the linear rate of migration of the combustion front and the cross-sectional area of the combustion front will be the number of unit volumes of formation through which the combustion front will pass in a unit time. Thus, for any linear rate of migration of the combustion front, the volume of the formation through which the combustion front will pass per unit time may be determined. As indicated previously, when the combustion front arrives at any portion of the formation, the amount of any carbonaceous deposit, or fuel, per unit volume of formation will have become fixed. To burn the carbonaceous deposit in any given unit volume of formation, a given amount of oxidizing gas will be required. Thus, the rate of injection of oxidizing gas to pass the combustion front through a given number of unit volumes of formation per unit time will be the product of this latter factor and the amount of oxidizing gas required to burn a unit amount of carbonaceous deposit. This rate of injection of oxidizing gas is the rate required to obtain the desired linear rate of migration of the flame front.

Mathematically expressed, the rate of injection of oxidizing gas required to obtain any given rate of migration is:

$$q = VAC \qquad (3)$$

wherein:

$q$=rate of injection of oxidizing gas in cubic feet per 24-hours day,
$V$=rate of migration of the combustion front in feet per 24-hour day,
$A$=cross-sectional area of the combustion front in square feet, and
$C$=volume of oxidizing gas required to burn the carbonaceous deposit in a unit volume of formation in cubic feet per cubic foot.

Substituting from Equation 1 the valve of V, Equation 3 becomes $$q = \frac{0.0235\rho}{hg} AC \qquad (4)$$

The rate of injection of oxidizing gas to maintain any given rate of migration of the combustion front must be progressively varied, as is known. As the combustion front migrates from an input well or wells in the direction of an output well or wells, the cross-sectional area of the combustion front will vary. The manner in which the cross-sectional area of the combustion front will vary with migration from the input well or wells is a function of the position of the output well or wells with respect to the input well or wells. For example, in the case of radial flow of oxidizing medium from a single input well, the combustion front will migrate radially outwardly from the input well. The combustion front, in this case, will be in the form of a cylinder having a radius represented by the distance the combustion front has migrated from the input well. If R is the distance the combustion front has migrated from the input well and $h$ is the thickness of the formation, the cross-sectional area of the combustion front will be equal to twice the product of $\pi R$ and $h$.

The manner in which the cross-sectional area of the combustion front varies with migration may be similarly computed for various other well patterns. Irrespective of the well pattern, however, the cross-sectional area of the combustion front can be measured by known methods. For example, the cross-sectional area of the combustion front may be measured by comparing the results of a geophysical survey made at the surface of the earth overlying the formation prior to initiation of combustion with a similar survey made at the time the cross-sectional area of the combustion front is desired to be known. The geophysical survey may be a seismic survey or may be an electrical resistivity survey. Procedures for measuring the cross-sectional area of the combustion front by the latter two types of surveys are the subject matter of United States Patent No. 2,803,305. The geophysical survey may also be a magnetic survey and a procedure for the measurement of the cross-sectional area of the combustion front by a magnetic survey forms the subject matter of United States Patent No. 2,770,305.

The amount of oxidizing gas required for combustion of a unit volume of formation is determinable by standard techniques. For example, this information may be obtained by tests carried out on a core sample taken from the formation. This core sample will be taken from the formation by well-known procedures designed to prevent loss of formation fluids from the core sample and influx of foregin fluids into the core sample during the sampling procedure. A known volume of the core sample is placed in a core sample cell through which the oxidizing gas can be passed and from which products of combustion can be recovered. Oxidizing gas is passed through the sample cell and combustion within the core sample is initiated. Initiation of combustion may be effected by heating the oxidizing gas, by means of an electrical heater or otherwise, to a temperature above the ignition temperature of the hydrocarbon material. The oxidizing gas preferably is the same oxidizing gas to be employed in carrying out combustion within the formation. If not, the oxygen content of the oxidizing gas is measured. The oxidizing gas is passed through the core sample until combustion is concluded and the amount of the oxidizing gas is measured. The conclusion of combustion is indicated by the disappearance of carbon dioxide in the gaseous products of combustion and, for determining when combustion is concluded, the gaseous products of combustion can be analyzed during the combustion operation. Combusion within the core sample will displace oil from the core sample. This oil is recovered and is measured as to quantity. Thus, there is determined the amount of oxidizing gas required for combustion of a unit volume of the formation, the amount of oil that is displaced from each unit volume of formation by passage of the combustion front, and the amount of oil displaced per unit amount of oxidizing gas. By measurement of the total amount of hydrocarbon material in each unit volume of formation, and subtracting from this amount the amount of hydrocarbon material recoverable by combustion, the amount of hydrocarbon material consumed in each unit volume of formation by passage of the combustion front is determined. Measurement of the total amount of hydrocarbon material in each unit volume of formation may be determined from a core sample taken from the formation by procedures whereby loss of formation fluids from the core sample, or contamination by foreign fluids of the core sample, during sampling is avoided. The core sample is treated to remove the hydrocarbon material from the core sample. Procedures which may be employed for this purpose include heating, flooding with water, and solvent extraction as described previously in connection with the determination of the specific gravity of the hydrocarbon material in the core sample. Preferably, solvent extraction is employed.

Subsequent to initiation of combustion within the formation, for any position of the combustion front within the formation the oxidizing gas is injected into the formation at a rate which is sufficiently great to effect the minimum rate of migration of the combustion front. To obtain any given rate of injection of oxidizing gas through the formation between the input and output wells, a particular pressure differential is required between the input and output wells. As will be explained in greater detail hereinafter, the pressure differential between an input well and each output well in an array of output wells to obtain any given rate of flow of oxidizing gas through the formation can be calculated knowing certain characteristics of the formation and of the hydrocarbon material within the formation. However, it is possible, as a practical matter, to vary the pressure differential between input and output wells until the desired rate of flow of oxidizing gas is attained.

The pressure differential employed between an input well and an output well or wells for effecting migration of the combustion front toward an output well must be such that the oil displaced from the formation by this migration of the flame front is not in excess of the amount given by Equation 2. The rate at which oil is displaced from the formation is readily determinable. The volume of oil that can be displaced by passage of the flame front per unit volume of formation can be determined, for example, from tests carried out on a core sample taken from the formation. This determination may be carried out simultaneously with the procedures previously described for determining the amount of carbonaceous deposit per unit volume of formation and the amount of oxidizing gas required to burn a unit amount of carbonaceous deposit. As indicated previously, oil is displaced from the core sample by the test procedure. The quantity of this displaced oil is measured. The rate at which oil is displaced from the formation by migration of the flame front will be the product of the rate of migration of the flame front, expressed in terms of unit volumes of the formation, and the volume of oil which may be displaced per unit volume of formation. Having determined the rate at which oil is displaced within the formation by migration of the flame front under the pressure differential employed, it can be compared with the rate at which oil can be produced from the formation, as given in Equation 2, under this same pressure differential.

For determining the rate at which oil can be produced for the formation to the output well or wells of any well pattern, the values for the effective permeability of the formation to oil, the thickness of the formation, the pressures at the input and output wells, the friction factor, and the viscosity of the oil are substituted in Equation 2 and the equation is solved for the value of $q_o$. The values for the thickness of the formation will have already been determined in connection with the solution of Equation 1. The values for the pressures at the input and output wells will have been determined, or calculated, as described previously in connection with the rate of injection of oxidizing gas required for effecting the minimum rate of migration of the flame front. The values for the effective permeability of the formation to oil and the viscosity of the oil are determined by standard procedures. The value for the friction factor may be determined as will be explained in greater detail hereinafter.

While the values of the effective permeability of the formation to oil and viscosity of the oil can be determined by standard procedures and are not part of the invention, a brief description of them will be given. The effective permeability of the formation to oil can be determined from measurements made on a core sample taken from the formation. The core sample, after cleaning and drying, as previously described, is completely saturated with water and placed in a test cell, such as a Hassler cell, which is adapted to permit measured flow of fluid through the core sample without leakage or flow of fluid along the side walls of the core sample. Oil, which may be the hydrocarbon material obtained from the formation or from a core sample taken from the formation, similarly as described previously in connection with the determination of the specific gravity of the hydrocarbon material in the formation, is passed under pressure through the core sample. When equilibrium conditions of flow rate and pressure drop are established, the rate at which the oil flows through the core sample is measured. The effective permeability of the formation is given by the usual expression for Darcy's law, namely, $$k_0 = \frac{q u_0 L}{A \Delta P} \quad (5)$$

wherein:

$k_0$=effective permeability of the core sample in darcies,
$q$=rate at which the oil flows through the core sample in cubic centimeters per second,
$u_0$=viscosity of the oil in centipoises,
$L$=length of the core sample in centimeters,
$A$=cross-sectional area of the core sample in square centimeters, and
$\Delta P$=pressure drop over the core sample in atmospheres.

The viscosity of the oil, which oil again may be obtained from the formation or from a core sample taken from the formation, is measured employing any suitable type of viscometer, such as an Ostwald viscometer. In Equation 2, the effective permeability appears in the numerator and the viscosity appears in the denominator. The factor $$\frac{k_0}{u_0}$$

is known as the mobility of the oil.

The friction factor, $f$, in Equation 2 has a value which depends upon the pattern of the input and output well or wells, the ratio of the distance between the input wells and the output wells to the radius of the wells, the position of the combustion front with respect to its distance across a line between the input well and the output well, and mobility ratio. Mobility ratio, as herein defined, is the mobility of the oxidizing gas in the portion of the formation traversed by the combustion front divided by the mobility of the combustion gases in the unburned portion of the formation. The friction factor may be determined analytically from the values of the factors just mentioned.

The friction factor can be expressed in terms of gas flow in the formation. In these terms, $f$, for any well pattern, has the value given by the expression:

$$f = \frac{q_g u_g T_f \times 10^4}{k_g h (p_{iw}^2 - p_{ow}^2)} \quad (6)$$

wherein:

$q_g$=rate of flow of gas through the formation in thousand of standard cubic feet per 24-hour day,
$u_g$=viscosity of the gas in centipoises,
$T_f$=temperature of the formation in degrees Rankine,
$k_g$=effective permeability of the formation to the gas in millidarcies,
$h$=thickness of the formation in feet,
$p_{iw}$=pressure of the gas at the input well in pounds per square inch absolute, and
$p_{ow}$=pressure of the gas at the output well in pounds per square inch absolute.

The factor $$\frac{k_g}{u_g}$$

is known as the mobility of the gas. From Equation 6, the value of the friction factor can be determined empirically. The gas flow in the formation may be that of the oxidizing gas. Thus, knowing the pressure at the input and output wells, the rate at which gas is entering the input well under these pressure conditions, the temperature of the formation, the effective permeability of the formation to the oxidizing gas, and the thickness of the formation, these values can be substituted in Equation 6 and the value of $f$ obtained.

Figure 1:
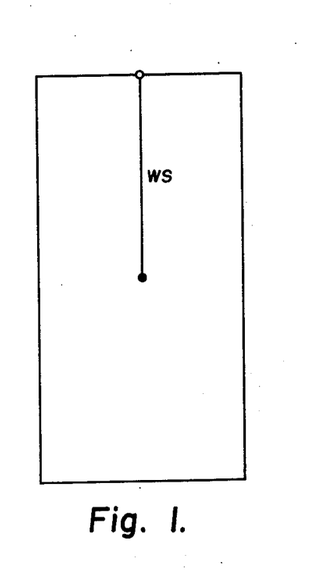
FIGURES 1 to 10 are charts illustrating various well patterns and FIGURES 11 to 20 are charts giving values of a friction factor for these well patterns.
Figure 2:
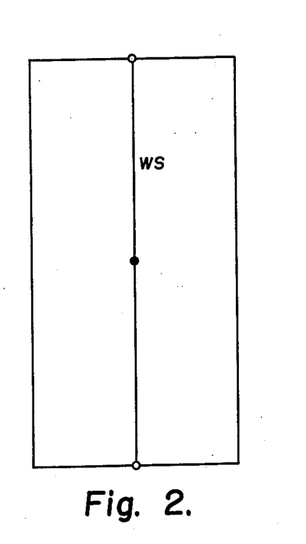
Figure 3:
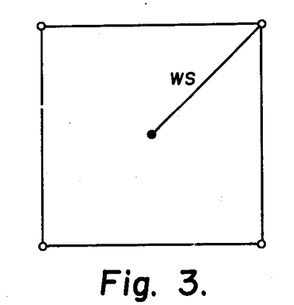
Figure 4:
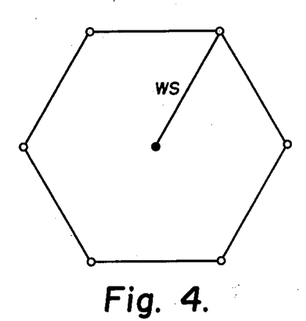
Figure 5:
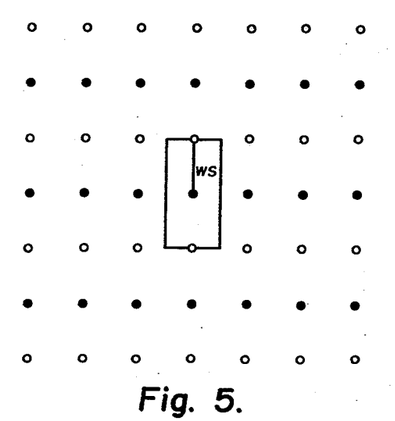
Figure 6:
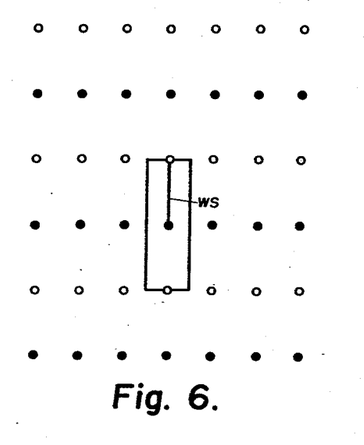
Figures 7, 17:
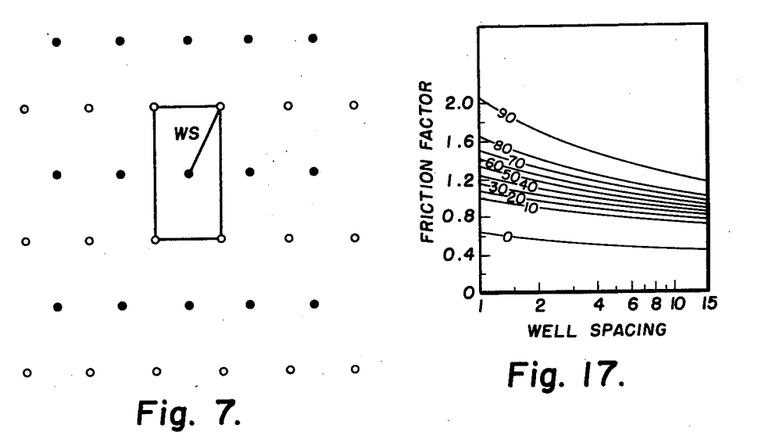
Figure 8:
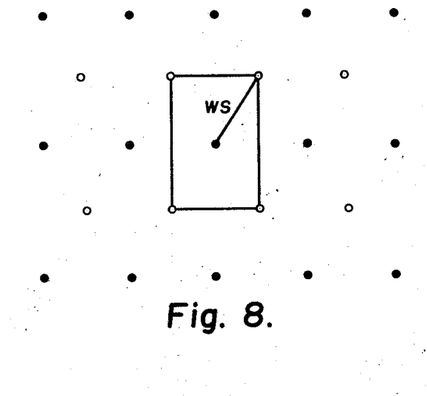
Figure 9:
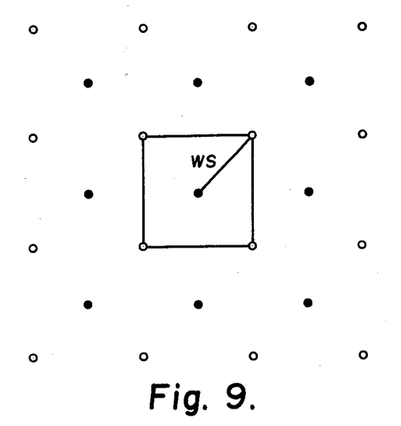
Figure 10:
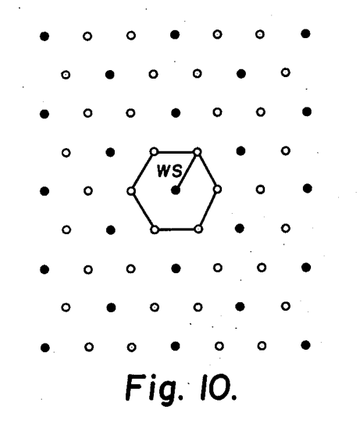
Figure 11:
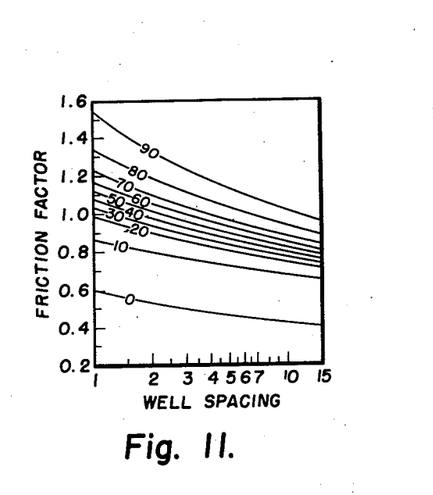
Figure 12:
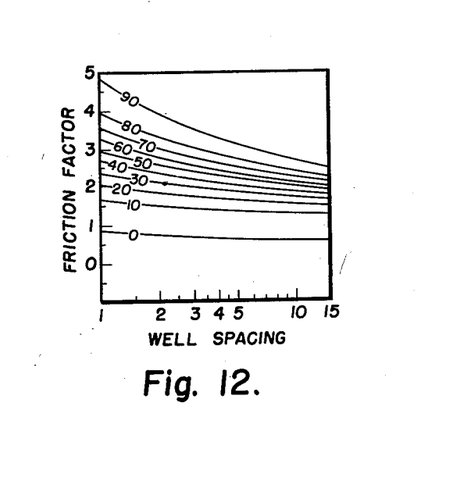

The values for the friction factor $f$ in equation 2, as indicated, can also be determined analytically. These values have been determined in this way for ten different well patterns. FIGURES 1 to 10, inclusive, illustrate these well patterns. FIGURES 11 to 20 give the values for the friction factors for the well patterns illustrated in FIGURES 1 to 10, respectively. The well patterns illustrated in FIGURES 1 to 10 are as follows:

FIGURE 1—Isolated, two-spot,
FIGURE 2—Isolated, three-spot,
FIGURE 3—Inverted, isolated, five-spot,
FIGURE 4—Inverted, isolated, seven-spot,
FIGURE 5—1:1 developed line drive,
FIGURE 6—1½:1 developed line drive,
FIGURE 7—1:1 staggered line drive,
FIGURE 8—1:⅓ staggered line drive,
FIGURE 9—Developed, five-spot, and
FIGURE 10—Inverted, developed, seven-spot.

In FIGURES 1 to 10, a solid circle represents an input well and a ring represents an output well. The line joining a solid circle and a ring represents the well spacing. In FIGURES 11 to 20, the abscissa represents the well spacing in hundreds of feet, the ordinate represents the friction factor, and the curves represent various locations of the combustion front expressed as the percent of the total distance between the input well and the output well.

In determining the values of the friction factor given in FIGURES 11 to 20, it was assumed that the mobility ratio was infinity. It was also assumed, for purposes of setting a value to the ratio of the distance between the input well and the output wells and the radius of the wells, that the radius of the wells was 0.276 foot. For other values of the mobility ratio and the ratio of distance between wells to well radius, the values of $f$ will differ. However, for all practical purposes, these differences will be insignificant as far as they affect the value of $f$.

It has been mentioned previously, in connection with the rate of injection of oxidizing gas required to obtain the minimum rate of migration of the combustion front, that the pressure differential between an input well and an output well to obtain a given rate of flow of oxidizing gas can be calculated. This given rate of flow may be the rate of flow required to obtain the minimum rate of migration of the combustion front. These pressure differentials may be calculated employing Equation 6. Equation 6 contains the friction factor $f$ and the value for the friction factor can be taken, for the particular pattern and position of the flame front, from FIGURES 1–10. The friction factor can then be substituted in Equation 6. The other factors in this equation, with the exception of the difference in the squares of the pressures at the input well and the output well, will be known. This equation can then be solved for this unknown quantity. Knowing the differences in the squares of the pressures, suitable values for each pressure may then be selected to give the required difference for the desired rate of injection of oxidizing gas.

In connection with the pressure differential required to obtain a rate of flow of oxidizing gas to obtain the minimum rate of migration of the combustion front, this pressure differential may be expressed, by combining Equations 4 and 6 and including a factor, namely, the numeral 1000, to make the units for $q$ in Equation 4 consistent with those for $q_g$ in Equation 6, as follows:

$$p_{iw}^2 - p_{ow}^2 = \frac{\frac{0.0235\rho}{1000hg}ACu_gT_f \times 10^4}{fk_gh} \qquad (7)$$

Where the value of $q_0$, as determined from Equation 2, differs from the rate at which oil is displaced within the formation by migration of the combustion front, adjustment of operating conditions may be effected. For most efficient operation, the rate at which oil is displaced within the formation by migration of the flame front should be equal to the rate at which oil can be produced from the output well or wells. However, complete equality of these two rates in practical operations may be difficult to achieve. In any case, it is preferred that the rate of oil displacement should not differ from the maximum rate of oil production by more than 10 percent.

Where the rate at which oil is displaced is greater than the rate at which the oil is produced, the rate at which the oil is displaced may be decreased or the rate at which the oil is produced may be increased. Similarly, where the rate at which oil is displaced is less than the rate at which the oil is produced by more than the desired margin, the rate at which the oil is displaced may be increased. Alternatively, in the latter case, the rate at which the oil is produced may be decreased. Economic considerations ordinarily will govern the selection between the alternate procedure of increasing the rate of oil production or decreasing the rate of oil displacement.

Adjustment of any of the operating conditions to obtain the desired values for the rate at which oil can be produced and the rate at which oil is displaced may be effected. Thus, a change can be made in the rate of injection of oxidizing gas whereby a change in the rate of migration of the combustion front, and thus of the rate at which oil is displaced, is effected. To make a change in the rate of injection of oxidizing gas requires that a change in the difference in the pressures at the input and output wells be made. Thus, since both the rate at which oil is displaced, i.e., the rate of migration of the combustion front, and the rate of production of oil depend upon the pressure differential between the input and output wells, a change in pressure differential affects both of these rates. The rate of production of oil is a direct function of the difference in the first power of the pressures at input and output wells. An increase in the difference between these pressures will increase the rate of production of oil and a decrease in the difference will decrease the rate of production. On the other hand, the rate of injection of the oxidizing medium is a direct function of the difference in the squares of the pressures at the input well and the output well. An increase in the difference between the squares of these pressures will increase the rate of injection of the oxidizing gas and a decrease in the difference will decrease the rate of injection of the oxidizing gas. Accordingly, with any given change in the pressure at the input and output wells, or either, the change in the rate at which oil is displaced will not correspond quantitatively with the rate at which oil is produced. It is therefore possible, with a change in the differences in the pressures at the input and output wells, to obtain a change in the rate of oil displacement which is different than the change in the rate of oil production. It is also possible, by selection of the absolute values of the pressure at the input well or wells and the pressure at the output well or wells, to effect a change in the rate of injection of oxidizing gas, and thus of the rate of oil displacement, without any change in the rate of oil production, and vice versa. For example, pressures at the input and output wells of 100 and 15 pounds per square inch, respectively, on the one hand and 110 and 25 pounds per square inch, respectively, on the other hand will produce different rates of gas injection but the rate of oil production will remain the same. Similarly, pressures at the input and the output wells of 100 and 15 pounds per square inch, respectively on the one hand and 110 and 48.2 pounds per square inch, respectively, on the other hand will produce the same rate of gas injection but the rate of oil production will be different. Thus, by control of the pressures at the input and output wells, control of the rate of oil displacement and oil production can be effected interdependently or independently.

Another adjustment in operating conditions which can be made is a change in the concentration of oxidizing medium in the oxidizing gas. An increase in the concentration of the oxidizing medium will increase the rate of migration of the combustion front and thus of the rate of oil displacement. A decrease in the concentration of the oxidizing medium will result in a decrease in the rate of oil displacement. These effects, of course, will be obtained assuming that there is no change in the rate of flow of the oxidizing gas of sufficient magnitude to compensate for the change in the concentration of oxidizing medium. An advantage of changing the concentration of oxidizing medium in the oxidizing gas is that a change in the pressure at either the input well or wells or the output well or wells is not necessary and thus the possibility of changing the rate of oil production is avoided. On the other hand, if desired, both change in the concentration of oxidizing medium and change in the rate of injection of oxidizing gas can be made.

In connection with control of the pressures at the input and output wells to obtain desired pressure differentials from the standpoint of oil displacement and oil production, practical considerations place a limit on the maximum pressure employed at an input well and the minimum pressure employed at an output well. The pressure employed at an input well cannot exceed the pressure of the overburden. If the pressure of the overburden is exceeded, the overburden will be lifted. The overburden pressure will be the pressure imposed by the weight of the earth material from the point of entry into the formation to the surface of the ground. This pressure is thus the product of the depth of the formation and the density of the earth material between the formation and the surface of the ground. For all practical purposes the density of the earth material can generally be regarded as 0.8. Thus, the maximum pressure at an input well will not exceed the product of the depth of the formation and the factor 0.8. The minimum pressure at an output well, from the standpoint of economy, will be near atmospheric pressure. Thus, the minimum pressure at an output well will be approximately 15 pounds per square inch absolute. Summarizing, the pressure differential between input and output wells will not ordinarily be greater than the difference between the pressure of the overburden and atmospheric pressure.

The following example will be illustrative of the invention.

In-situ combustion is carried out in a subterranean petroleum oil reservoir having the following characteristics:

| | |
|---|---|
| Depth of reservoir from surface | 375 feet. |
| Thickness of reservoir ($h$) | 20 feet. |
| Pattern of wells | Inverted, isolated 5 spot (FIG. 3). |
| Well spacing | 500 feet. |
| Bulk density of the formation ($\rho$) | 115 pounds per cubic foot. |
| Temperature of the formation | 95° F. or 555° R. |

From measurements made on core samples taken from the formation, the following information was obtained:

| | |
|---|---|
| Effective permeability of the formation to air ($k_g$) | 75 millidarcies. |
| Oil content | 0.0344 barrel of oil per cubic foot of formation. |
| Amount of oil recoverable by combustion | 0.0298 barrel of oil per cubic foot of formation. |
| Amount of oil consumed by combustion | 0.0046 barrel of oil per cubic foot of formation. |
| Amount of air required | 64,900 cubic feet, at standard conditions of temperature and pressure, per barrel of oil consumed by combustion, or 10,000 cubic feet, at standard conditions of temperature and pressure, per barrel of oil displaced. |
| Specific gravity of recovered oil ($g$) | 21.5° API, or 0.925 as compared to water. |
| Mobility of oil ($k_0/u_0$) | 10 millidarcies per centipoise. |

Substituting the values for the bulk density, the thickness of the formation, and the specific gravity of the oil in Equation 1, the minimum rate of migration of the combustion front for the formation is:

$$\frac{(0.0235)(115)}{(20)(0.925)} = 0.146 \text{ foot per 24-hour day}$$

Assume that the combustion front has progressed 10 percent of the total distance between the input well and each of the output wells. The combustion front will then have progressed 50 feet from the input well and will be in the shape of a circle having a radius of 50 feet. In one 24-hour day, the combustion front will migrate through the formation a distance of 0.146 foot. The volume rate of migration of the combustion front through the formation at the 50 foot radius may be taken as the average of the values at twelve hours prior and subsequent to reaching the 50 foot radius. Twelve hours prior to reaching the 50 foot radius, the combustion front will have migrated to 49.927 feet ($r_1$) from the input well and twelve hours subsequent to reaching the 50 foot radius, the combustion front will have migrated to 50.073 feet ($r_2$) from the input well. The volume rate of migration of the combustion front through the formation at the 50 foot radius will thus be:

$$h\pi(r_2^2 - r_1^2) = (20)(3.1416)(50.073^2 - 49927^2) = 917$$
cubic feet per 24-hour day.

Accordingly, a combustion front at the 50 foot radius migrating at the minimum rate is passing through, on the average, 917 cubic feet of formation per day.

Since 0.0046 barrel of oil is consumed per unit volume of formation by combustion, oil is being consumed at the 50 foot radius at a rate of:

$$(0.0046)(917) = 4.22 \text{ barrels per day}$$

For each barrel of oil that is burned, 64,900 cubic feet of air are required. Thus, the rate of air injection to maintain combustion at the 50 foot radius is:

$$(4.22)(64,900) = 273,878 \text{ cubic feet of air per day}$$

The rate of air injection given above is the rate which will effect the minimum rate of migration of the combustion front required to maintain combustion within the formation. The pressure conditions between the input well and the output wells necessary to obtain this rate of air injection can be determined empirically by manipulation of the pressures at the wells. Thus, the pressure at the input well can be varied until the necessary rate of air injection is obtained. The pressure at the output wells can also be varied, if desired, although ordinarily, as indicated, the pressure at the output wells will be near atmospheric pressure.

Figure 13:
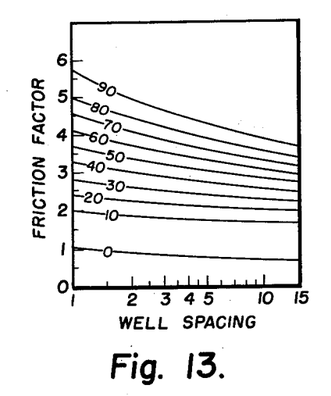
Figure 14:
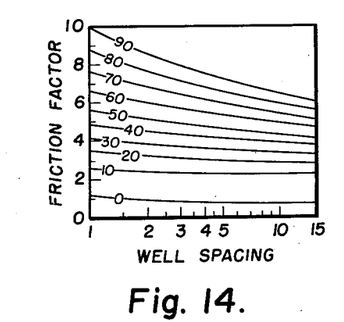
Figure 15:
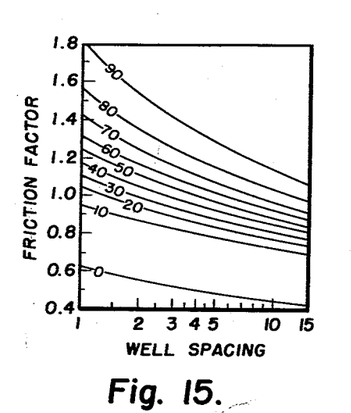
Figure 16:
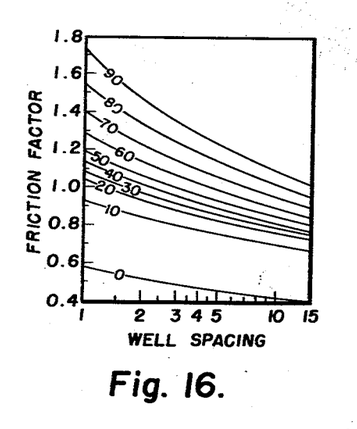
Figure 18:
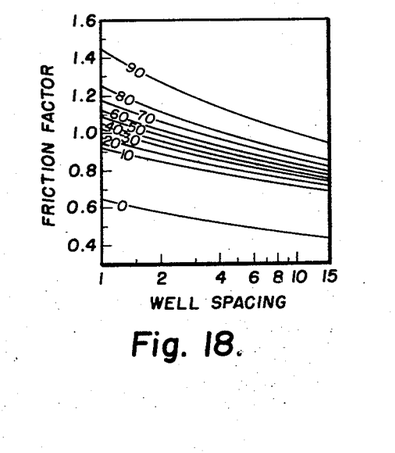
Figure 19:
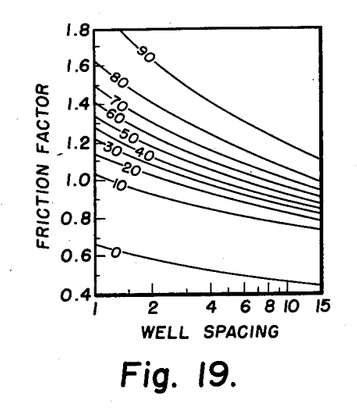
Figure 20:
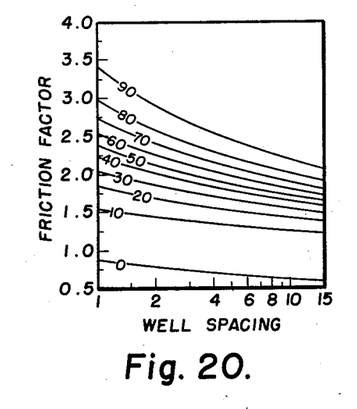

The pressure differential required to maintain the minimum rate of air injection can also be calculated employing Equation 6. Since the well pattern is an inverted, isolated 5-spot, the friction factor can be obtained from FIGURE 13. With reference to FIGURE 13, with a 500 foot well spacing and at a location of the combustion front of 50 feet from the input well, i.e., 10 percent of the total distance between the input well and the output wells, the friction factor will have a value of 1.75. The viscosity of air at standard conditions of temperature and pressure is 0.0188 centipoise. Transposing Equation 6 and substituting values, the value for the difference in the squares of the pressures will be given by:

$$(p_{iw}^2 - p_{ow}^2) = \frac{q_g u_g T_f \times 10^4}{f k_g h}$$

$$= \frac{(273.878)(0.0188)(555 \times 10^4)}{(1.75)(75)(20)} = 10,907$$

Any combination of pressures at the input well and the output wells that will give a difference in their squares of 10,907 will be satisfactory to maintain the minimum rate of migration of the combustion front. Ordinarily, as indicated, the pressure at the output wells will be near atmospheric pressure. Assuming the pressure at the output wells to be 15 pounds per square inch absolute, a pressure of 103.21 pounds per square inch absolute of the air at the input well will result in injection at the rate necessary for migration of the flame front at the minimum rate.

The maximum pressure differential that may be employed between the input well and the output wells is the one that will effect a rate of migration of the combustion front such that oil is displaced at a rate not greater than that at which the oil can be produced from the output wells. The rate at which oil can be displaced, regardless of the pressure differential between the input well and the output wells, can be determined knowing the rate of air injection. Thus, for the minimum rate of injection of air of 273,878 cubic feet per day, since 10,000 cubic feet of air will displace one barrel of oil, the rate at which oil is displaced is 27.39 barrels of oil per day. The rate at which oil is displaced for any given pressure differential can be determined from Equation 6. This equation gives the rate of air injection and from this latter value the rate at which oil is being displaced from the formation becomes known. The maximum rate at which oil can be produced from the output wells for any given pressure differential is given by Equation 2. Each of Equations 6 and 2 contains the terms, $p_{iw}$ and $p_{ow}$. Thus, values for $p_{iw}$ and $p_{ow}$ can be found which will give a value for the quantity of oil produced in Equation 2 which will be equal to the amount of oil displaced by the rate of air injection given by Equation 6. In the present instance, assuming that the value for $p_{ow}$, the pressure at the output well, is 15 pounds per square inch absolute, a pressure of $p_{iw}$, the pressure at the input well, of 124.73 pounds per square inch absolute will produce oil at the same rate that it is displaced.

From Equation 6 the rate of air injection is:

$$q_g = \frac{fk_gh(p_{iw}^2 - p_{ow}^2)}{u_gT_f \times 10^4} = \frac{(1.75)(75)(20)(124.73^2 - 15^2)}{(0.0188)(555 \times 10^4)}$$

$$= \frac{40,254,375}{104,340} = 386 \text{ thousand cubic feet per day}$$

With air being injected at the rate of 386,000 cubic feet per day and 10,000 cubic feet of air displacing one barrel of oil, 38.6 barrels of oil per day will be displaced. From Equation 2, the rate of oil production is:

$$q_0 = \frac{1.007 \times 10^{-3}k_0h(p_{iw} - p_{ow})f}{u_0}$$

$$= (1.007 \times 10^{-3})(10)(20)(124.73 - 15)(1.75)$$

$$= 38.6 \text{ barrels of oil per day}$$

Thus, with the pressure at the input well of 124.73 pounds per square inch absolute and a pressure at the output wells of 15 pounds per square inch absolute, the rate of oil production is equal to the rate of oil displacement.

Having thus described my invention, it will be understood that such description has been given by way of illustration and example and not by way of limitation, reference for the latter purpose being had to the appended claims.

I claim:
1. In a process for the recovery of hydrocarbon material from a subterranean formation containing hydrocarbon material and having an input well leading thereto and an output means leading therefrom including at least one output well wherein combustion of hydrocarbon material within said formation is initiated and oxidizing gas is injected into said subterranean formation through said input well and as a result thereof a combustion front migrates through said subterranean formation from said input well in the direction of said output means, the heat of which combustion front displaces hydrocarbon material from said formation and leaves a carbonaceous deposit which is the fuel consumed by the combustion front and said hydrocarbon material is producible from said output means, the steps comprising injecting oxidizing gas into said formation at a rate at least as great as that given by the expression:

$$q = \frac{0.0235\rho}{hg}AC$$

wherein:

$q$ = the rate of injection of oxidizing gas in cubic feet per 24-hour day,
$\rho$ = the bulk density of the dry formation in pounds per cubic foot,
$A$ = cross-sectional area of the combustion front in square feet,
$C$ = the volume of oxidizing gas required to burn the carbonaceous deposit in a unit volume of formation in cubic feet per cubic foot,
$h$ = the thickness of the formation in feet, and
$g$ = the specific gravity of the hydrocarbon material originally in the formation, maintaining a pressure $p_{iw}$ at said input well and a pressure $p_{ow}$ at said output means, and displacing said hydrocarbon material from said formation at a rate not greater than that given by the expression:

$$q_0 = \frac{1.007 \times 10^{-3}k_0h(p_{iw} - p_{ow})f}{u_0}$$

wherein:

$q_0$ = the rate at which hydrocarbon material can be produced from the output means in barrels per 24-hour day,
$k_0$ = the effective permeability of the formation to hydrocarbon material in millidarcies,
$h$ = the thickness of the formation in feet,
$p_{iw}$ = the pressure at the input well in pounds per square inch absolute,
$p_{ow}$ = the pressure at the output means in pounds per square inch absolute,
$u_0$ = viscosity of the hydrocarbon material in centipoises, and
$f$ = a friction factor having the value given by the expression:

$$f = \frac{q_gu_gT_f \times 10^4}{k_gh(p_{iw}^2 - p_{ow}^2)}$$

wherein:

$q_g$ = rate of flow of gas through the formation in thousand of standard cubic feet per 24-hour day,
$u_g$ = viscosity of the gas in centipoises,
$T_f$ = temperature of the formation in degrees Rankine,
$k_g$ = effective permeability of the formation to the gas in millidarcies,
$h$ = thickness of the formation in feet,
$p_{iw}$ = pressure of the gas at the input well in pounds per square inch absolute, and
$p_{ow}$ = pressure of the gas at the output means in pounds per square inch absolute.

2. In a process for the recovery of hydrocarbon material from a subterranean formation containing hydrocarbon material and having an input well leading thereto and an output means leading therefrom including at least one output well wherein combustion of hydrocarbon material within said subterranean formation is initiated and oxidizing gas is injected into said subterranean formation through said input well and as a result thereof a combustion front migrates through said subterranean formation from said input well in the direction of said output means and displaces hydrocarbon material from said formation and said hydrocarbon material is producible from said output means, the step comprising moving said combustion front through said formation at a rate that is at least as great as that given by the expression:

$$V = \frac{0.0235\rho}{hg}$$

wherein:

$V$ = the rate of migration of the combustion front in feet per 24-hour day,
$\rho$ = the bulk density of the dry formation in pounds per cubic foot,
$g$ = the specific gravity of the hydrocarbon material originally in the formation, and
$h$ = the thickness of the formation in feet, but not in excess of that at which hydrocarbon material is displaced from said formation at the rate given by the expression:

$$q_0 = \frac{1.007 \times 10^{-3}k_0h(p_{iw} - p_{ow})f}{u_0}$$

wherein:

$q_0$ = the rate at which hydrocarbon material can be produced from the output means in barrels per 24-hour day,
$k_0$ = the effective permeability of the formation to hydrocarbon material in millidarcies,
$h$ = the thickness of the formation in feet,
$p_{iw}$ = the pressure at the input well in pounds per square inch absolute,
$p_{ow}$ = the pressure at the output means in pounds per square inch absolute,
$u_0$ = viscosity of the hydrocarbon material in centipoises, and
$f$ = a friction factor given in the accompanying FIGURES 11 to 20.

3. In a process for the recovery of hydrocarbon material from a subterranean formation containing hydrocarbon material and having an input well leading thereto and an output means leading therefrom including at least one output well wherein combustion of hydrocarbon material within said subterranean formation is initiated and oxidizing gas is injected into said subterranean formation through said input well and as a result thereof a combustion front migrates through said subterranean formation from said input well in the direction of said output means and displaces hydrocarbon material from said formation and said hydrocarbon material is producible from said output means, the steps comprising maintaining a pressure $p_{iw}$ at said input well and a pressure $p_{ow}$ at said output means, injecting oxidizing gas through said input well and into said formation at a rate which is given by the expression:

$$q_g = \frac{f k_g h (p_{iw}^2 - p_{ow}^2)}{u_g T_f \times 10^4}$$

wherein:

$q_g$ = rate of flow of gas through the formation in thousand of standard cubic feet per 24-hour day,
$f$ = friction factor given in the accompanying FIGURES 11 to 20,
$k_g$ = effective permeability of the formation to the gas in millidarcies,
$h$ = thickness of the formation in feet,
$p_{iw}$ = pressure of the gas at the input well in pounds per square inch absolute,
$p_{ow}$ = pressure of the gas at the output means in pounds per square inch absolute,
$u_g$ = viscosity of the gas in centipoises, and
$T_f$ = temperature of the formation in degrees Rankine, and which effects migration of said flame front at a rate that is at least as great as that given by the expression:

$$V = \frac{0.0235 \rho}{hg}$$

wherein:

$V$ = the rate of migration of the combustion front in feet per 24-hour day,
$\rho$ = the bulk density of the dry formation in pounds per cubic foot,
$g$ = the specific gravity of the hydrocarbon material originally in the formation, and
$h$ = the thickness of the formation in feet, but not in excess of that at which hydrocarbon material is displaced from said formation at the rate given by the expression:

$$q_0 = \frac{1.007 \times 10^{-3} k_0 h (p_{iw} - p_{ow}) f}{u_0}$$

wherein:

$q_0$ = the rate at which hydrocarbon material can be produced from the output means in barrels per 24-hour day,
$k_0$ = the effective permeability of the formation to hydrocarbon material in millidarcies,
$h$ = the thickness of the formation in feet,
$p_{iw}$ = the pressure at the input well in pounds per square inch absolute,
$p_{ow}$ = the pressure at the output means in pounds per square inch absolute,
$u_0$ = viscosity of the hydrocarbon material in centipoises, and
$f$ = a friction factor given in the accompanying FIGURES 11 to 20.

4. In a process for the recovery of hydrocarbon material from a subterranean formation containing hydrocarbon material and having an input well leading thereto and an output means leading therefrom including at least one output well wherein combustion of hydrocarbon material within said subterranean formation is initiated and oxidizing gas is injected into said subterranean formation through said input well and as a result thereof a combustion front migrates through said subterranean formation from said input well in the direction of said output means, the heat of which combustion front displaces hydrocarbon material from said formation and leaves a carbonaceous deposit which is the fuel consumed by the combustion front and said hydrocarbon material is producible from said output means, the steps comprising determining the volume of said hydrocarbon material displaced from said formation per unit volume of said oxidizing gas passing through said combustion front, maintaining a pressure $p_{iw}$ at said input well and a pressure $p_{ow}$ at said output means, injecting said oxidizing gas into said formation through said input well at a rate greater than that given by the expression:

$$q = \frac{0.0235 \rho}{hg} AC$$

wherein:

$q$ = the rate of injection of oxidizing gas in cubic feet per 24-hour day,
$\rho$ = the bulk density of the dry formation in pounds per cubic foot,
$A$ = cross-sectional area of the combustion front in square feet,
$C$ = the volume of oxidizing gas required to burn the carbonaceous deposit in a unit volume of formation in cubic feet per cubic foot,
$h$ = the thickness of the formation in feet, and
$g$ = the specific gravity of the hydrocarbon material originally in the formation, and displacing hydrocarbon material from said formation at a rate not greater than that given by the expression:

$$q_0 = \frac{1.007 \times 10^{-3} k_0 h (p_{iw} - p_{ow}) f}{u_0}$$

wherein:

$q_0$ = the rate at which hydrocarbon material can be produced from the output means in barrels per 24-hour day,
$k_0$ = the effective permeability of the formation to hydrocarbon material in millidarcies,
$h$ = the thickness of the formation in feet,
$p_{iw}$ = the pressure at the input well in pounds per square inch absolute,
$p_{ow}$ = the pressure at the output means in pounds per square inch absolute,
$u_0$ = viscosity of the hydrocarbon material in centipoises, and
$f$ = a friction factor given in the accompanying FIGURES 11 to 20.

References Cited in the file of this patent

UNITED STATES PATENTS 2,642,943    Smith _________________ June 23, 1953

OTHER REFERENCES

Heath, W. A. et al.: "Secondary Recovery in Oklahoma," pp. 545–560 in Secondary Recovery of Oil in the United States, 2nd ed., American Petroleum Institute, New York, 1950.

UNITED STATES PATENT OFFICE
CERTIFICATE OF CORRECTION

Patent No. 3,130,781                          April 28, 1964

Robert L. Koch

It is hereby certified that error appears in the above numbered patent requiring correction and that the said Letters Patent should read as corrected below.

Column 1, line 52, for "combinstion" read -- combustion --; column 2, line 13, for "combination" read -- combustion --; column 5, line 54, after "in" insert -- an --; column 8, line 67, for "for" read -- from --; column 10, line 40, for "1:1/3" read -- 1:1 1/3 --.

Signed and sealed this 8th day of September 1964.

(SEAL)
Attest:

ERNEST W. SWIDER                        EDWARD J. BRENNER
Attesting Officer                           Commissioner of Patents